United States Patent [19]

Aldrich et al.

[11] Patent Number: 4,641,502

[45] Date of Patent: Feb. 10, 1987

[54] ROOF MOUNT AIR CONDITIONER

[75] Inventors: Roger L. Aldrich, LaGrange, Ind.;
Peter C. Bodett, Sturgis, Mich.;
Richard E. Kelly, Orland, Ind.

[73] Assignee: The Duo-Therm Corporation, Ind.

[21] Appl. No.: 883,581

[22] Filed: Jul. 9, 1986

Related U.S. Application Data

[63] Continuation of Ser. No. 690,097, Jan. 9, 1985, abandoned.

[51] Int. Cl.$^4$ ............................................. B60H 10/02
[52] U.S. Cl. ........................................ 62/244; 62/429;
62/508; 62/DIG. 16; 98/2.14
[58] Field of Search ................. 62/239, 244, 429, 428,
62/507, 508, DIG. 16, 469; 220/366, 3.2, 355,
356; 98/52, 2.14; 261/DIG. 3, DIG. 4, DIG. 17

[56] References Cited

U.S. PATENT DOCUMENTS

| | | | |
|---|---|---|---|
| 1,949,505 | 3/1934 | Warren | 62/469 |
| 2,075,389 | 3/1937 | Eubank | 62/241 |
| 2,585,180 | 2/1952 | Smith | 220/356 |
| 2,799,143 | 7/1957 | Weizel | 62/244 X |
| 3,315,488 | 4/1967 | Lind | 62/259.1 X |
| 3,417,576 | 12/1968 | Stucky | 62/244 |
| 3,668,887 | 6/1972 | Riello | 62/262 |
| 4,098,093 | 7/1978 | Czyl | 62/244 X |
| 4,102,148 | 7/1978 | Matthews et al. | 62/429 X |
| 4,144,719 | 3/1979 | Williams et al. | 62/244 X |
| 4,217,764 | 8/1980 | Armbruster | 62/244 X |

Primary Examiner—William E. Tapolcai

Attorney, Agent, or Firm—Barnes, Kisselle, Raisch, Choate, Whittemore & Hulbert

[57] ABSTRACT

A roof mounted air conditioning unit for recreation vehicles comprising a cabinet made up of a base pan and a removable shroud. The base pan has a bottom wall and an upstanding perimeter wall with an outwardly protruding porch flange extending around the entire upper edge of the perimeter wall to provide stiffening reinforcement and a ledge on which the shroud seats. The ledge has air inlets and outlets therein providing air flow communication between ambient air and the condenser compartment. The perimeter wall also has air inlets and outlets therein. The shroud is generally imperforate and serves as a roof-like cover for the base pan. The shroud has a generally light color and the base pan has a generally dark color such that the air inlets and outlets in the pan perimeter wall are camouflaged from view. The cabinet is sub-divided by bulkheads into junction compartments including an evaporator coil compartment and the condenser coil compartment. Evaporator and condenser centrifugal blowers are disposed respectively in the evaporator and condenser compartments for inducing air flow respectively therethrough. An electric motor is coaxially disposed between the blowers and has a drive shaft coupled thereto for concurrent operation thereof. A rotary hermetic compressor is disposed in a cylindrical case and oriented with its longitudinal axis generally horizontal to thereby cooperate with the blowers in reducing the overall vertical dimension of the system components to provide a low profile cabinet.

32 Claims, 10 Drawing Figures

ROOF MOUNT AIR CONDITIONER

This is a continuation of co-pending application Ser. No. 690,097 filed on Jan. 9, 1985, now abandoned.

This invention relates to self-contained air conditioning units of the mechanical or compressor type, and, more particularly, to an improved air conditioning unit adapted to be mounted on the roof of a recreational vehicle or the like for cooling the interior passenger space of the vehicle.

Several types and models of self-contained mechanical air conditioning units have been provided over the past twenty or thirty years which are especially adapted to mount on the roof of recreational vehicles (RV), truck tractor cabs and similar vehicles. Typically RV industry standards call for the unit to be superposed to a standard 14" by 14" opening in the roof and ceiling of the recreational vehicle through which the cooled air is ducted downwardly from the air conditioning unit into the passenger space, and stale warm air is exhausted from the passenger space therebelow into the air conditioning unit for cooling and return of the same.

One prior commercial example of such a roof mount air conditioner is that manufactured by The Duo-Therm Corporation of LaGrange, Ind. as Duo-Therm Roof Mount Air Conditioner Model No. 57915-001. Typically the air conditioning components are mounted on a sheet metal base pan which forms the main structural supporting component of the unit, and a removable shroud is attached over the base pan and components to provide protection from the elements and also to provide an aesthetically pleasing appearance for the unit as viewed from the exterior of the vehicle. One such prior art shroud is shown in U.S. Pat. No. Des. 206,103. Typically the condenser coil of the air conditioning unit is arranged in the rear or aft end of the unit (relative to vehicle orientation) and grill openings are provided in the side walls of the shroud to admit exterior ambient air to the condenser compartment. A condenser fan, usually an axial-flow fan, is mounted in this compartment to blow the exterior ambient air through the condenser coil to extract heat from the same. Such condenser cooling air is exhausted from the rear of the shroud, which may be entirely open or provided with vents in its rear wall to accommodate this flow back to ambient.

Although such prior commercial units in general operate quite satisfactorily for the purposes intended, they tend to be rather ungainly or unsightly due to their relatively large vertical or height dimension protruding above the roof of the vehicle. Also, the requirement for condenser coil air flow ventilation, with the accompanying side wall grill vents and open rear for exhaust air, readily admit rain, sleet, snow and road dust and dirt, and thus have prevented the shroud from serving as a complete weather seal for the air conditioning components. Thus, hitherto the air conditioning components had to be designed to withstand invasion from such adverse ambient elements, which added to the cost of the unit and shortened service life.

In addition to the aforementioned commercial prior art, the following prior art patents are of general interest relative to the background and field of the present invention, although not suggestive thereof:

| United States | 2,075,389 | Eubank |
|---|---|---|
| United States | 2,247,028 | Kuntz |
| United States | 3,315,488 | Lind |
| United States | 3,848,428 | Rieter, Jr. |
| United States | 4,144,719 | Williams et al |
| Japanese | 55-35872 | |
| U.S. Design | 103,336 | Peo |
| U.S. Design | 206,103 | Bodett |
| U.S. Design | 209,581 | Noyes |
| U.S. Design | 213,559 | Baugh et al |
| U.S. Design | 226,381 | Harty, Jr. |
| U.S. Design | 249,703 | Zimmerman et al |
| U.S. Design | 250,661 | Anderson et al |
| U.S. Design | 257,787 | Armbruster |

Accordingly, an object of the present invention is to provide an improved roof mount air conditioner for recreational vehicles or the like which has an equal or better cooling capacity with respect to equal size and weight prior art units, while at the same time providing a significantly reduced vertical dimension in order to impart an aesthetically pleasing "low profile" aspect when mounted on the roof of a recreational vehicle or the like.

Another object of the present invention is to provide an air conditioning unit of the aforementioned character in which the air inlets and outlets for the condenser compartment are essentially hidden from view to thereby further enhance the aesthetically pleasing appearance of the air conditioning unit.

Another object of the present invention is to provide an air conditioning unit of the aforementioned character which is better shielded by the cabinet shroud from inclement weather invasion, and which provides a more streamlined appearance and aerodynamically efficient housing for the air conditioning unit.

These and other objects as well as advantages and features of the present invention will become apparent from the following detailed description taken in conjunction with the accompanying drawings, wherein:

Figure 1:
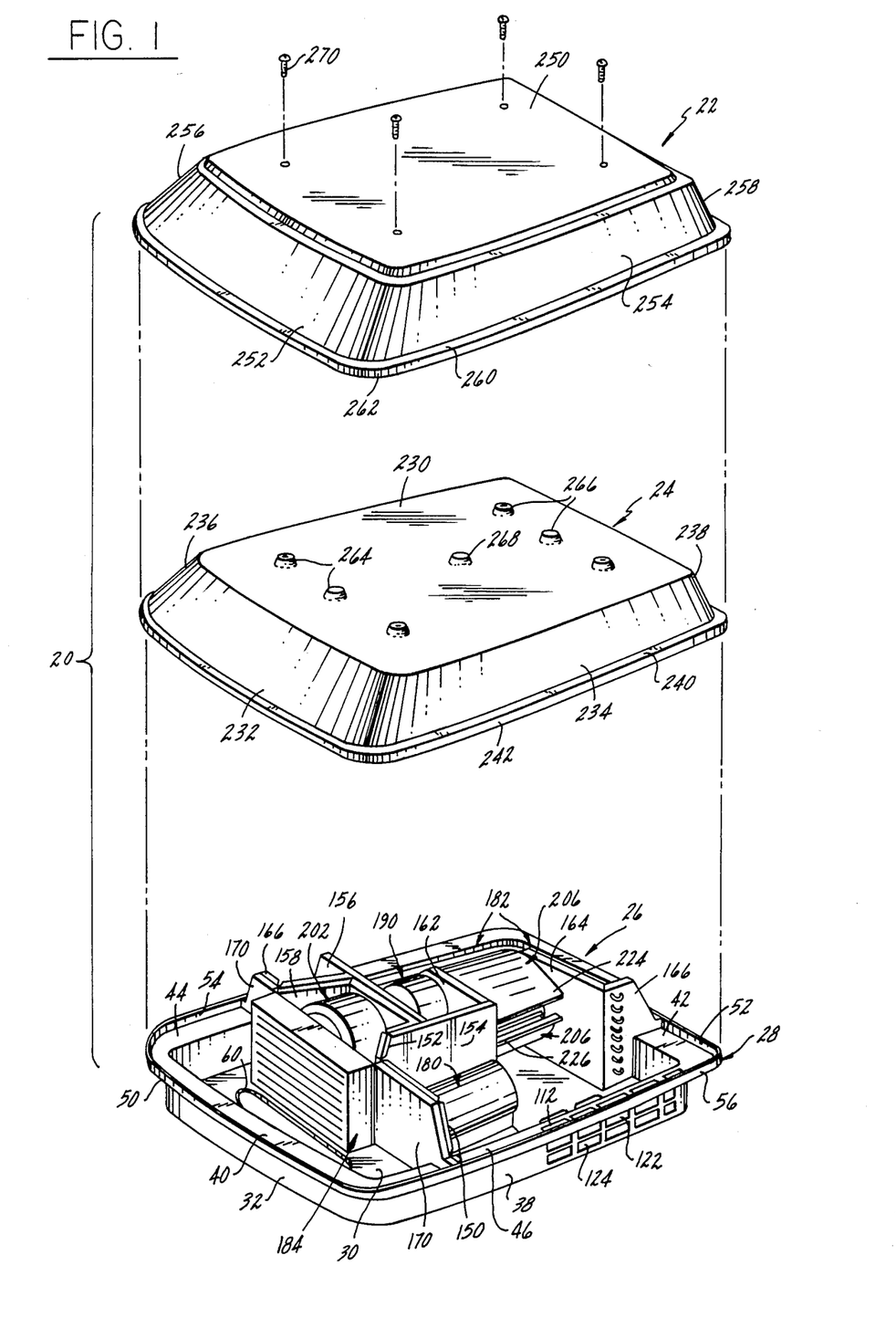
FIG. 1 is an exploded perspective view of a preferred, but exemplary, embodiment of a roof mount air conditioner constructed in accordance with the present invention, the shroud outer cover and shroud inner liner being exploded from the base of the unit.

Referring in more detail to the accompanying drawings, a roof mount air conditioner 20 constructed in accordance with the present invention is illustrated In FIG. 1 with a shroud outer cover 22 and a shroud inner liner 24 exploded above the base subassembly 26 of the unit. Base subassembly 26 comprises a base pan 28 made as a one-piece metal stamping which forms the main structural supporting component of the unit, on which the various air conditioning components and compartment bulkheads are mounted. The ornamental aesthetic aspects of the design of the shroud and base pan in assembly are the subject of a co-pending United States design patent application Ser. No. b 635,622, filed July 30, 1984, (now U.S. Pat. No. Des. 284,025) in the name of William H. Armstrong and assigned to The Duo-Therm Corporation, the original assignee herein and assignor to the present asignee of record, Dometic Incorporated.

Base Pan

As can be seen with reference to FIGS. 2-10 as well as FIG. 1, base pan 28 is a generally rectangular shape in plan view (FIG. 4) with the front half having slightly convergent side walls and with the corners of the base pan rounded. Base pan 28 comprises a generally flat bottom wall 30, the outer periphery of which is bounded by upturned vertical wall portions comprising a front wall 32, rear wall 34, right-hand or starboard wall 36 and left-hand or port wall 38 which rise vertically approximately 3" (in one preferred working embodiment) from the bottom floor 30. The upper edges of each of the perimeter walls 32,34,36,38 are integrally connected through a radius bend to a horizontal perimeter flange or "porch" extending outwardly of the associated perimeter wall so as to form front, rear, starboard and port flange portions 40,42,44,46, respectively, extending as one integral continuous ledge all the way around the perimeter of the base pan. Front flange portion 40 has the narrowest or least projection dimension, for example, about ⅛", and, as will best be seen in FIG. 4, the starboard and port flange portions 44,46 have a gradually increasing horizontal projection dimension outwardly of the base pan increasing toward the rear of the unit, with the rear flange 42 having the maximum projection distance, for example, about 2¾". The perimeter horizontal porch flange 40,42,44,46 of base pan 28 terminates at its outer peripheral edge in a integrally connected upwardly bent vertical edge flange defined by a front edge, rear edge, starboard and port edge portions 50,52,54,56, respectively, of uniform height and defining an upper edge in a common plane.

Figure 6:
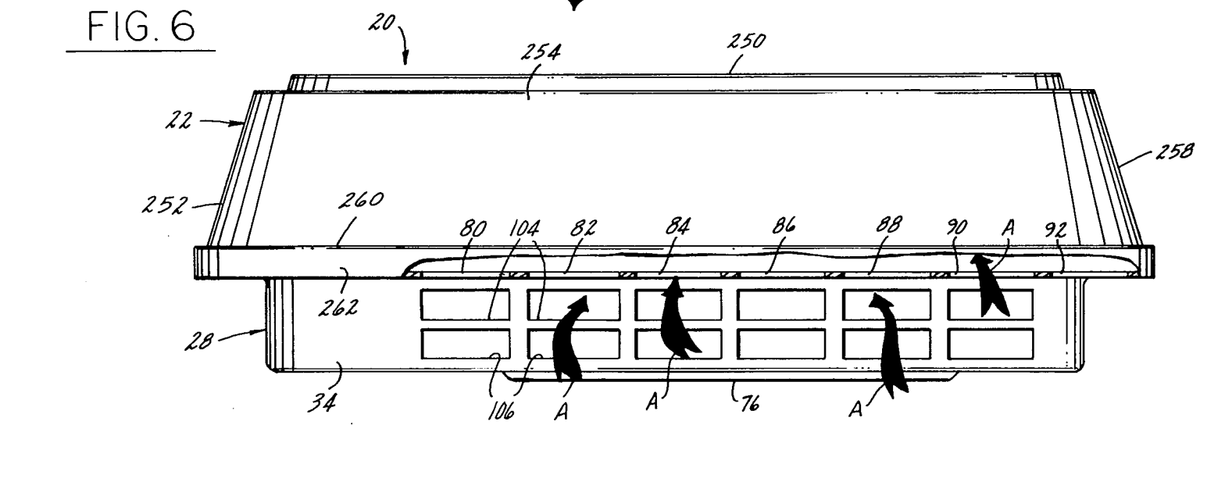
FIG. 6 is an elevational view of the rear or aft end of the air conditioner unit of FIGS. 1-5.
Figure 7:
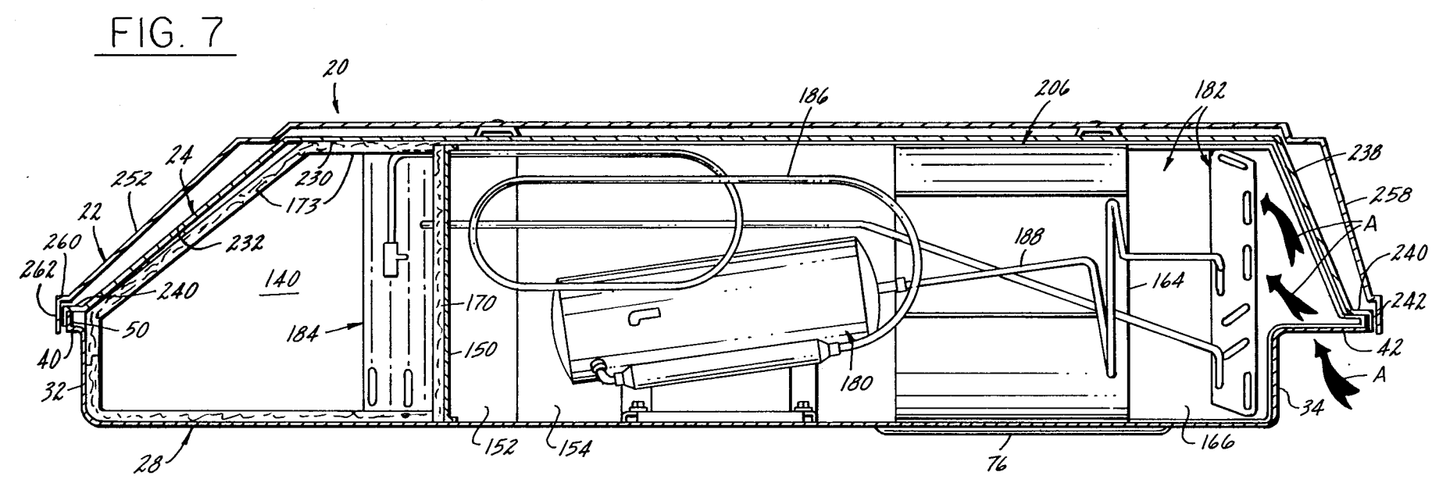
FIGS. 7, 8, 9 and 10 are vertical sectional views taken on the lines 7—7, 8—8, 9—9 and 10—10, respectively, of FIG. 4.
Figure 8:
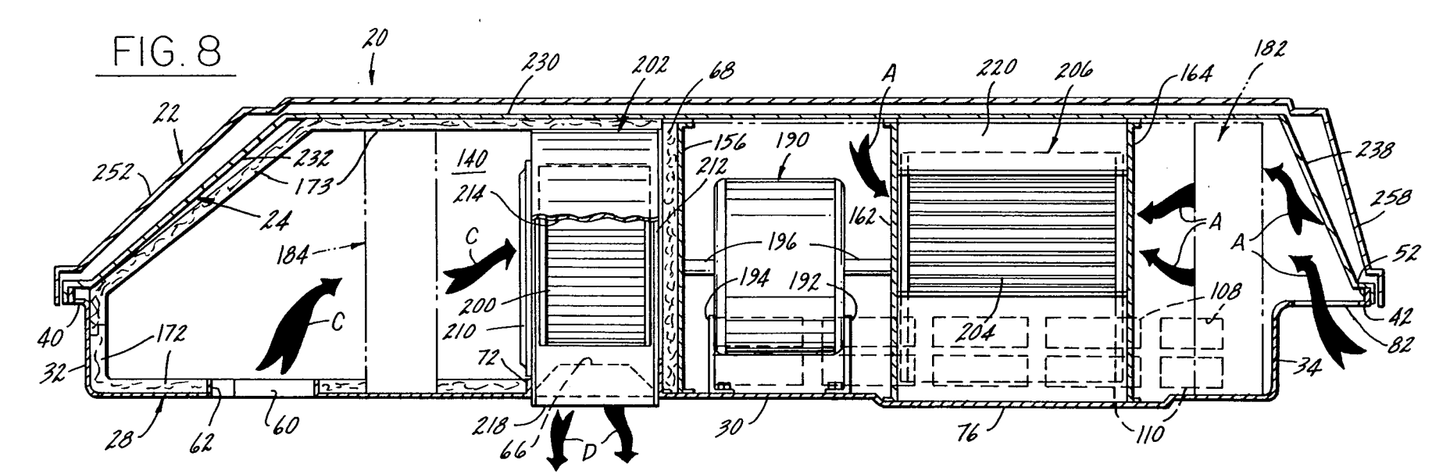
Figure 9:
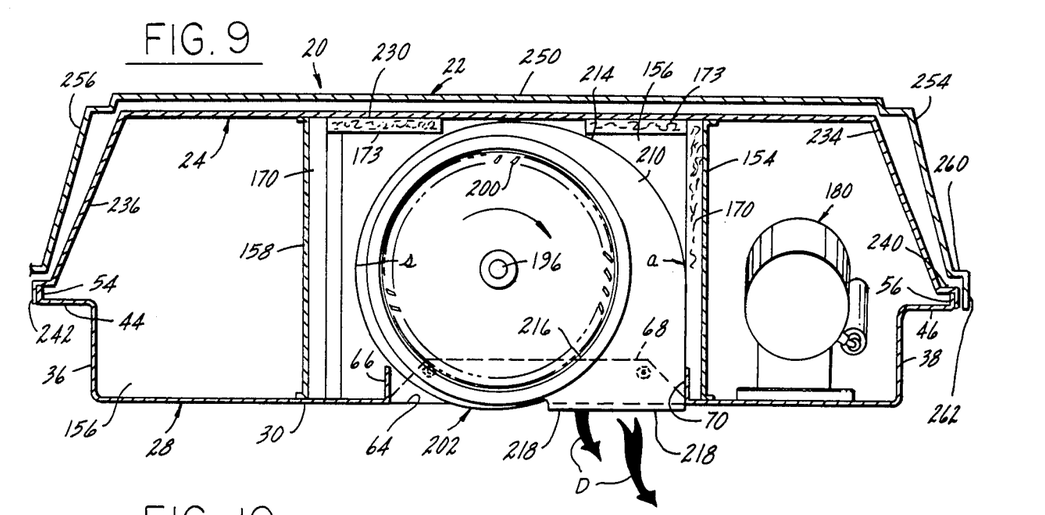

Bottom wall 30 of base pan 28 is provided with an air inlet opening 60 adjacent the front edge of the bottom wall, bounded by an integral upstanding peripheral flange 62 (FIG. 8). A rectangular air outlet opening 64 (FIGS. 4 and 9) is provided in bottom wall 30 between air inlet 60 and the center of the unit, and is bounded by upwardly bent peripheral flanges 66,68,70,72 (FIGS. 8 and 9). As best seen in FIGS. 5-10, bottom wall 30 has in the rearward portion thereof a centrally located, downwardly depressed, rectangularly shaped portion 76 which extends below the remaining portion of bottom wall 30 about ¼" and provides additional vertical clearance for accommodating condenser blower 206.

Figure 4:
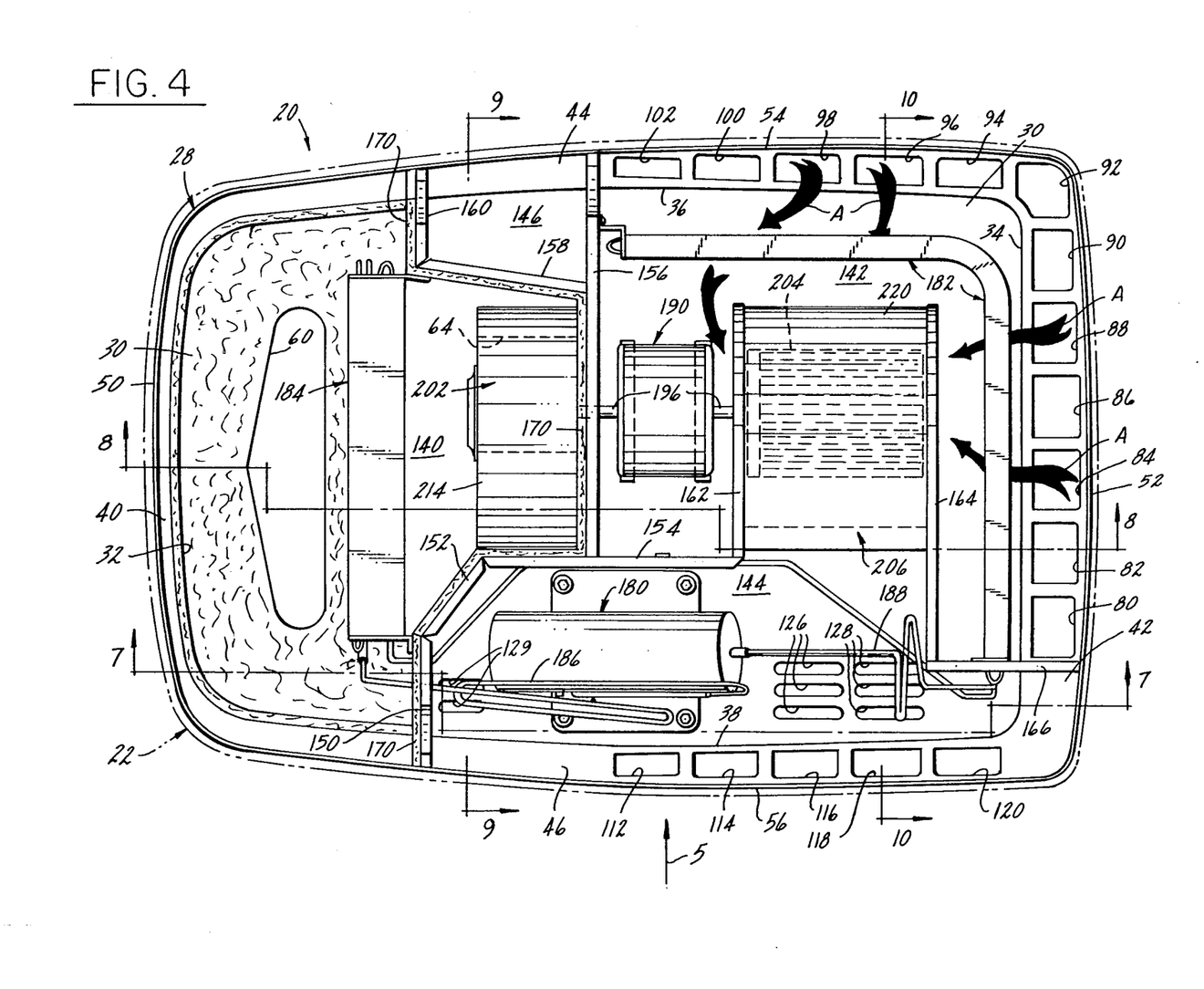
FIG. 4 is a top plan view of the air conditioning unit of FIGS. 1-3 with the shroud illustrated in phantom and made transparent.

The rear half of base pan 28 is provided with a series of rows of openings for admitting and expelling ambient air to and from the compressor compartment of the air conditioning unit 20 in a manner to be described in more detail hereinafter. Approximately half of the ambient air inlet openings are provided in the rear porch flange 42 and the rear half of starboard porch flange 44, as best seen in FIG. 4. Thus, rear flange 42 has a row of varying sized rectangular openings 80,82,84,86,88,90,92 and starboard side flange 44 has similar openings 94,96,98,100,102. The other half of the ambient air inlet openings are provided in rear wal 34 and the rear half of starboard side wall 36. Thus, as shown in FIG. 6, rear wall 34 has horizontally extending rows of upper and lower openings 104 and 106, which may be six each in number. The rear half of the starboard side wall 36 is likewise provided with two horizontally extending rows of upper and lower openings 108 and 110, indicated in phantom by dotted lines in FIG. 8, with five openings in each row.

Figure 2:
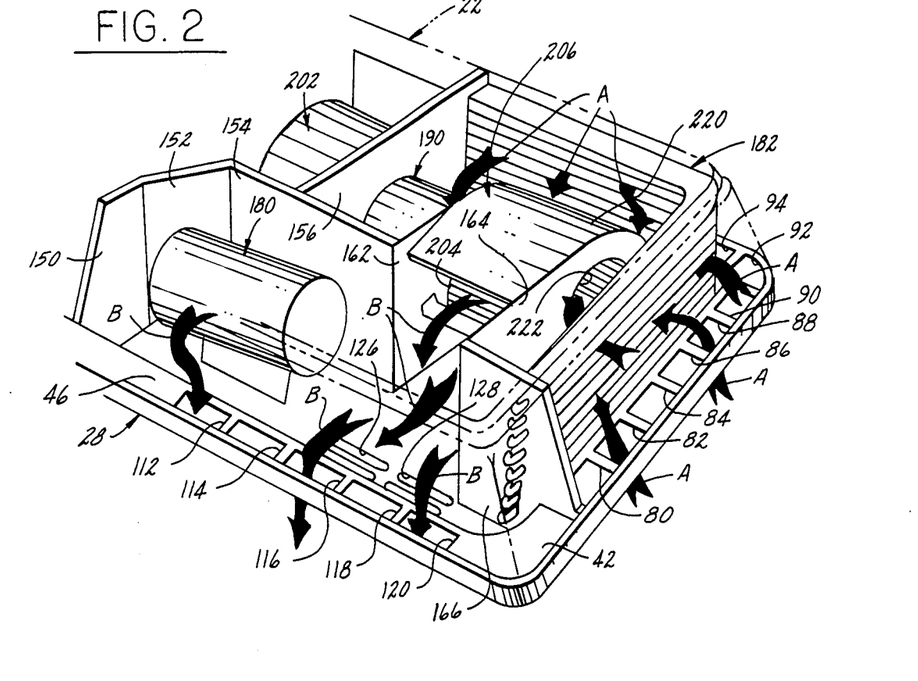
FIG. 2 is a fragmentary perspective view of the rear or aft end of the air conditioner unit with the cabinet shroud made transparent and shown in phantom, and illustrating forced air flow through the condenser and compressor compartments with air flow arrows.
Figure 5:
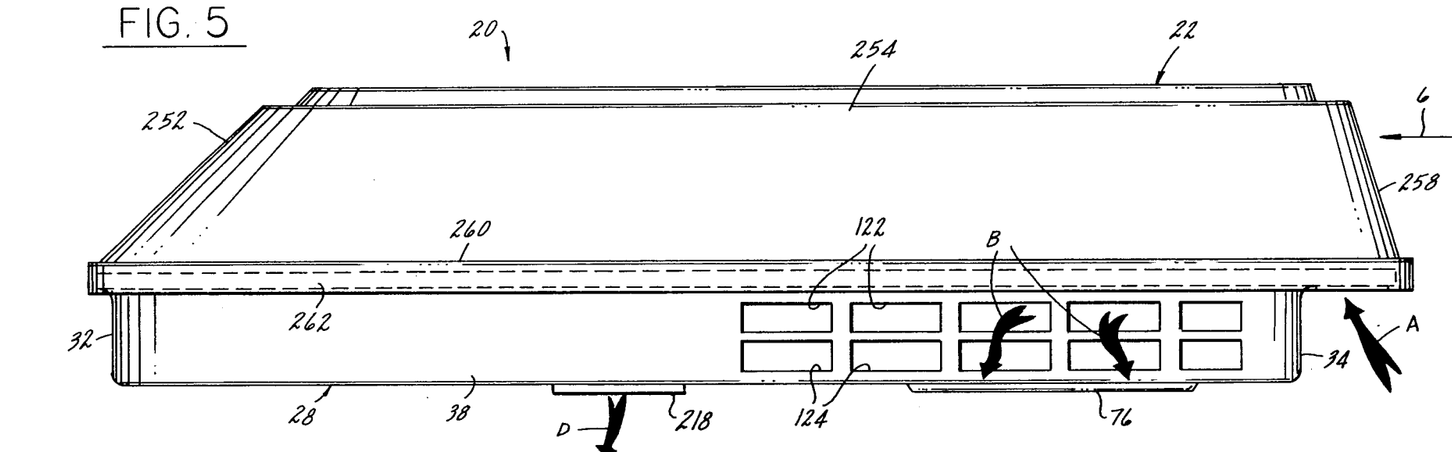
FIG. 5 is an elevational view of the left hand or port side of the unit of FIGS. 1-4 as viewed looking in the direction of the arrow 5 in FIG. 4.

The condenser compartment ambient air outlets consist of a row of openings 112,114,116,118,120 provided in the rear half of the port side porch flange 46 (FIG. 4 and also FIGS. 1 and 2) and, as best seen in FIGS. 1 and 5, two horizontal rows of five openings each comprising upper openings 122 and lower openings 124 disposed below the flange openings 112-120. In addition to the porch, flange and side wall air outlet openings 112-124, additional ambient outlet openings are provided in bottom wall 30 by three rows of slots 126, 128 and 129 communicating with the space between bottom wall 30 and the roof of the recreational vehicle (FIGS. 2 and 4).

Cabinet Compartments

A series of partitions or bulkheads of sheet metal construction are screwed to the base pan to sub-divide the interior space of air conditioning unit 20 into a series of function compartments for housing the various components of the mechanical refrigeration system provided in unit 20. The arrangement of these bulkheads is best seen in FIGS. 1, 2, 3 and 4. Thus, the interior space of air conditioning unit 20 is sub-divided into an evaporator compartment 140 generally occupying about one-third of the unit at the forward end thereof, a condenser compartment 142 occupying most of the rear half of the unit, a compressor compartment 144 running along the port side of the unit for about two-thirds of the length thereof rearwardly of the evaporator compartment, and a control compartment 146 provided along the starboard side of the unit between evaporator compartment 140 and condenser compartment 142. The bulkheads dividing these various compartments consist of compressor compartment bulkheads 150,152,154, an evaporator compartment bulkhead 156, control compartment bulkheads 158,160, condenser blower bulkheads 162,164, and condenser bulkhead 166. These bulkheads extend vertically between the bottom wall 30 of base pan 28 (to which they are affixed by screws, not shown) and the interior surface of the cover inner liner 24 in substantially sealed relation to the juxtaposed top and bottom walls 24 and 30 of the interior of unit 20. Preferably the surfaces of the bulkheads 150,152,156,158,160 facing the interior of the evaporator compartment 140 are lined with suitable insulating sheet material indicated at 170 in FIGS. 1, 4, 8 and 9. Likewise, insulation material 172 is provided on the interior surface of bottom wall 30 facing evaporator compartment 140 as shown in FIGS. 4 and 8. This material extends upwardly adjacent the side wall 32 and, as shown in FIGS. 7, 8 and 9, interconnects with a cover 173, also made of insulating sheet material, which extends from front wall 32 rearwardly to bulkheads 150-160 to thereby form a sealed and insulated compartment 140.

Air Conditioning System Components

Air conditioning unit 20 houses the usual functional components of a mechanical refrigeration system, some of which however are modified and especially adapted for inclusion in an air conditioning unit 20 in accordance with the invention. In general, these air conditioning system components comprise a hermetically sealed rotary compressor 180 mounted on floor 30 in compressor compartment 144, a condenser coil 182 mounted in condenser compartment 142, and an evaporator coil 184 mounted in evaporator compartment 140. A suction line conduit 186 is coupled between the outlet of evaporator 144 and the inlet of compressor 180 and a discharge line conduit 188 is coupled between the outlet of compressor 180 and the inlet of condenser coil 182. Likewise the outlet of condenser coil 182 is coupled through a liquid refrigerant conduit (not shown) to the inlet and capillary orifice of evaporator coil 184. Except as noted hereinafter, these components are constructed and function in a conventional and well known manner and, therefore, the operation of the same will not be described in detail hereinafter. Air conditioning unit 20 also includes a blower electric motor 190 mounted by brackets 192,194 (FIG. 8) on the bottom wall 30 in condenser compartment 142. Motor 190 has a single blower drive shaft 196 extending coaxially through the armature of the motor and protruding from the opposite ends of the motor and extending axially parallel to the longitudinal dimension of air conditioning unit 20. The forward end of shaft 196 extends through bulkhead 156 and has fixed thereon for rotation therewith a scroll 200 (FIG. 8) of an evaporator compartment blower 202 which in turn is mounted in the rear end of evaporator compartment 140. The rear or aft end of motor shaft 196 extends through bulkhead 162 and has fixed thereon for rotation therewith the scroll 204 (FIG. 8) of a condenser compartment blower 206. The evaporator blower 202 has a housing made up of a pair of sheet metal side walls 210 and 212 flanking scroll 200 and interconnected by a curved perimeter wall 214, as best seen in FIGS. 4, 8 and 9. Side wall 210 has a cylindrical inlet opening 216 facing evaporator compartment 140 adjacent the rear side of evaporator coil 184. The rectangular outlet duct 218 of blower 202 extends slightly downwardly through bottom wall opening 64 between its perimeter flanges 66,68,70,72 (FIGS. 8 and 9).

Condenser blower 206 also has a housing enclosing its scroll 204 and consisting of bulk heads 162 and 164 flanking scroll 204 and interconnected by a perimeter wall 220, as best seen in FIGS. 2, 4, 8 and 10. Each of the bulkheads 162 and 164 has a cylindrical inlet opening 222 therein which are coaxially aligned, of the same diameter and register with the opposite open ends of scroll 204. Perimeter wall 220 has an outlet upper extension 224 (FIG. 10) extending tangentially outwardly from its curved top portion, and a shorter, outwardly turned lower extension 226, these extensions defining therebetween an outlet opening 228 of blower 206 which is dimensioned and oriented at a downwardly inclined angle in accordance with the present invention to direct blower discharge air into compressor compartment 144.

Cabinet Cover

Referring to FIG. 1 as well as FIGS. 5–8, the shroud inner liner 24 is a one-piece sheet steel stamping having a top wall 230 generally rectangular in plan view and an outwardly and downwardly sloping perimeter wall comprising front wall 232, port side wall 234, starboard side wall 236 and rear side wall 238 and being contoured as shown in FIGS. 7–10 as well as in FIG. 1. These walls merge at their lower edge into an integral perimeter horizontal flange 240 running continuously around inner liner 24, which in turn merges integrally with a vertically downwardly extending lip flange 242. When inner liner 24 is placed in assembly over base pan 28, flange 240 rests on the upper edge of base pan perimeter flanges 50,52,54,56, and lip flange 242 seats closely against the outer surface of these base pan flanges to provide a substantially sealed imperforate cover for base pan 28.

Outer shroud 22 is molded from high impact resistant plastic, such as ABS, to provide a decorative outer cover for unit 20. Outer shroud 22 has a top wall 250 and an integral perimeter wall comprising front, port, starboard, and rear walls 252,254,256,258, respectively, sloping downwardly and outwardly therefrom, with their contour being best seen in FIGS. 7–10. Outer shroud 22 also has a perimeter horizontal flange 260 and an integral vertical lip flange 262 similar to those of inner liner 24. The top wall 230 of inner liner 24 has seven raised integral bosses, three of the same arranged in a front row 264 and another three in a rear row 266, as well as one boss 268 centrally disposed in wall 230 (FIG. 1). Outer shroud 22 is dimensioned slightly larger than the inner liner so that it is spaced therefrom by these bosses as shown in FIGS. 7–10 when mounted in assembly thereover. The outermost four bosses have bolt holes to receive mounting screws 270 which pass through holes in outer shroud 22, and thence through the aforementioned apertured bosses and inner liner 24 into threaded attachment points in the base components of the unit. With the foregoing cover arrangement, the inner liner 24 serves as a snug seal for the base pan 28 and meets Underwriter Laboratories fireproofing requirements, whereas outer shroud 22 provides a corrosion proof, impact resistant decorative shroud for air conditioning unit 20.

Roof Installation

Air conditioner 20 is designed to be installed on the roof of a recreational vehicle, normally over an existing roof vent which is removed to create a standard 14"×14" opening through the roof. The air conditioner is mounted on a relatively flat level section of the roof of the vehicle when the same is parked on a level surface. A neoprene rubber gasket (not shown) is attached to the bottom wall 30 of base pan 28 adapted to register with and surround the roof through-opening. Two additional gasket or cushion strips (not shown) extend transversely of unit 20 between the vehicle roof and bottom wall 30, one fore and one aft of depression 76, to further support unit 20 with bottom wall 30 spaced slightly above the vehicle roof surface. Condenser compartment outlets 126,128,129 communicate with this clearance space, which in turn is open to ambient at the port side of the unit. When unit 20 is properly installed, room air inlet opening 60 and the outlet 218 of evaporator blower 202 both register with suitable duct work provided in a so-called air box or air splitter (not shown), which in turn is mounted up against the ceiling in the interior space of the recreational vehicle in registry with the through-roof vent opening. Such air boxes are conventional and well known and not part of the present invention. Suffice it to say that the same are provided with room air exhaust grille openings leading to a duct which in turn communicates with opening 60. Also, such air boxes have a cool air distribution duct with cool air grille outlets, this duct communicating with the outlet 218 of blower 202.

Operation

The operation of the mechanical refrigeration system provided in air conditioning unit 20 is generally conventional and well understood in the art, except for the unique arrangement of the air conditioning system components in cooperation with base pan 28 and associated shrouds 22, 24 as well as the condenser coil, condenser blower and compressor modifications, which features are noted in more detail hereinafter. In general, when the conventional control system components (not shown) call for cooling of the interior space of the recreational vehicle, electric motor 190 is energized to drive the evaporator blower 202 and condenser blower 206 in unison, the hermetic compressor 180 is also energized. Blower operation induces a negative pressure in both the evaporator compartment 140 and the condenser compartment 142.

Considering first the air flow on the condenser side of the unit, ambient outside air, indicated by the air flow arrows A in FIGS. 2, 4, 5, 6, 7, 8 and 10, enters condenser compartment 142 through the horizontal air inlets 80-102 in the base porch overhang flanges 42 and 44, as well as through the vertical air inlets 104,106 in base rear wall 34 and vertical air inlets 108,110 in the rear half of base side wall 36. This condenser cooling air flows upwardly from these inlets and thence through the condenser coil 182, the air flow being induced through both legs of coil 182 by the suction pressure created at the dual inlets 232 of blower 206. After passing through condenser coil 182 and into inlets 222, the heated air is expelled by centrifugal force from the blower scroll 204 into the surrounding housing of blower 206 from which it is expelled via the outlet 228 thereof downwardly at the aforementioned 30° angle into compressor compartment 144, as indicated by air flow arrows B in FIGS. 2 and 10. The condenser blower discharge air then exits to ambient from compressor compartment 144 via the horizontal air outlets 112-120 in the port side porch flange 46, the vertical outlets 122,124 in the rear half of base side wall 38 and the row of slots 126,128 in the bottom wall 30 of base 28.

Figure 3:
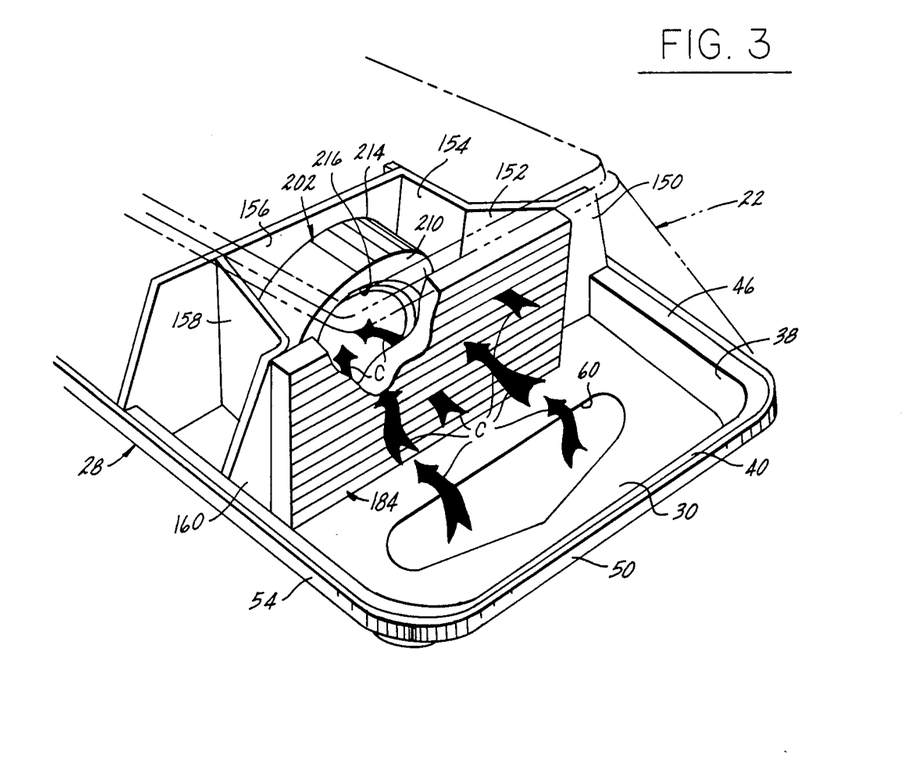
FIG. 3 is a fragmentary perspective view of the front or forward portion of the unit, the shroud again being shown in phantom and made transparent, and with air flow arrows illustrating forced air flow through the evaporator compartment of the unit.

Referring next to the air flow in evaporator compartment 140, return air from the interior space of the recreational vehicle is drawn through the aforementioned ceiling-mounted air box (not shown) and enters the evaporator compartment 140 through opening 60 in bottom wall 30 of base pan 28, as indicated by air flow arrows C in FIGS. 3 and 8. This warm room air flows upwardly and thence through the evaporator coil 184 which cools the same, and then is drawn into the single inlet 216 of evaporator blower 202. This cooled air is forced by the centrifugal action of scroll 200 radially outwardly into the housing 210,214 of blower 202, from whence it is discharged tangentially downwardly through blower outlet 218 to the associated cool air distribution ducts of the air box or splitter, this discharge flow of vehicle room cooling air being indicated by the arrows D in FIGS. 5, 8 and 9.

Features

From the foregoing description of the components and construction of one working example of an air conditioning unit 20 of the present invention, taken in conjunction with the accompanying drawings, it will now be more readily apparent that an air conditioning unit constructed in accordance with the concepts and principles of the present invention possesses many unique features which provide many advantages as well as improved results over prior art roof mount air conditioners. One of the most significant of these features and advantages is a substantial reduction in overall height as well as length of the unit. For example, in the illustrated commercial working embodiment 20 to the total overall height is $9\frac{1}{2}''$, which is about 3" lower than the prior conventional units hitherto available. This amounts to an approximately 25% reduction in overall height, and contributes to the low profile aspect ratio of the air conditioning unit 20 of the invention. The low aspect ratio helps hide the roof mounted unit from view and reduces the vehicle overhead clearance rating. Vertical height reduction primarily results from the provision of a modified Rotorex rotary compressor 180 which, instead of being mounted with its axis vertical or upright, is capable of operation with a "horizontal" mounting as shown in FIG. 7, wherein the major or longitudinal axis of the compressor is substantially horizontal, i.e., 8° inclined upwardly from the horizontal. One model of a commercially available rotary hermetic air conditioning compressor suitable for use as compressor 180 is that made by Rotorex Company of Frederick, Md. and identified by Model No. H48A131B0. In addition, provision of a single electric blower motor 190 and the pair of equal height centrifugal blowers 202 and 206 driven by motor 190 in unison, also contributes to height reduction. By contrast prior commercial roof mounted units customarily employed an upright compressor and an axial flow fan for condenser cooling, which in turn required a greater overall cabinet height.

Another principle feature of an air conditioning unit 20 constructed in accordance with the present invention is the "clam shell" cabinetry or housing design obtained by utilizing a monolithic imperforate cover (shroud 22,24) removably mounted on the perimeter porch overhang provided by horizontal flanges 40,42,44,46 of base pan 28. This novel split-level cabinet design enables the air inlets and outlets for the condenser compartment to be substantially hidden from view, thereby contributing to an asthetically pleasing appearance. Since the porch flange is only about 3" above the roof surface of a recreational vehicle when unit 20 is centrally located and mounted thereon, it is virtually impossible to see the porch flange horizontal air inlet and outlet openings 80-102 and 112-120 from any observer angle. Moreover, by making shroud 22 some light shade in color, such as white or tan, and base 28 a dark shade, such as black or brown, and by inwardly recessing each side wall 34,36,38 under the overhang to place the same in the overhang shadow, the vertical side wall air inlet and outlet openings 104-110 and 122,124 are camouflaged and thereby also substantially hidden from view. Hence with unit 20, the condenser coil 182 is completely under cover and the air inlet and outlet vents are "tucked away", thereby eliminating the unsightly side grille openings and large open rear end of the cabinets of prior art commercial roof mount air conditioners.

The continuous perimeter flanges 40-46 and 50-56 also serve to reinforce and rigidify base pan 28 as well as provide a convenient hand hold for unit 20 which facilitates installation and servicing of the unit.

The provision of dual centrifugal blowers 202 and 206, particularly blower 206 in the condenser compartment 142, cooperates with the more compact cabinetry of unit 20 and the low level hidden air inlets and outlets by creating sufficiently greater magnitudes of suction and discharge pressures to produce enough ambient air flow to and from the condenser compartment 142 and compressor compartment 144 for adequate air cooling of condenser coil 182 without significantly de-rating compressor 180. In addition, the L-shaped configuration of condenser coil 182, which is arranged so as to extend across the rear end and along the starboard side of compartment 142, provides greater condenser surface area even in the more compact cabinetry arrangement. This configuration and placement of condenser coil 182 also cooperates with the adjacent air inlets of condenser compartment 142 and the dual spaced inlets of blower 206 to provide adequate air flow cooling of the condenser. That is, despite the apparent asymetric or unbalanced air inlet positioning relative to the interior space of compartment 142, i.e., all low level inlets and outlets, with no air inlets or outlets in the cabinetry shroud 22,24, substantially uniform and high volumetric air flow is achieved through condenser coil 182.

Since shroud 22-24 need have no air inlets or outlets the same can be made imperforate, and is mounted to overhang base 28 completely around its lower periphery, air conditioner unit 20 is much better protected from invasion by adverse ambient elements, such as rain and snow, than prior art units. This cabinet shielding feature also permits the use of a less expensive, unshielded electric motor 190 within the cabinet. This in turn provides better cooling of the motor and enables a smaller, less costly and lower weight motor to be utilized, as compared to prior art units.

The low profile, split-level cabinetry of the present invention also provides a more streamlined appearance and also a more aerodynamically efficient housing. Yet the efficiency and BTU capacity of air conditioning unit 20 is at least equal to, and in some cases exceeds, that of bulkier prior commercial roof mounted air conditioners. For example, in one working embodiment of air conditioning unit 20 constructed in accordance with the present disclosure, a 13,500 BTUH rating was achieved with an evaporator air flow maximum and minimum values of 300 and 200 CFM, utilizing a 115 volt, 60 hertz, single-phase AC power supply, a 15.5 amp load rating, an approximate net weight of 109 pounds and a power rating of 1.7 killowatts.

Figure 10:
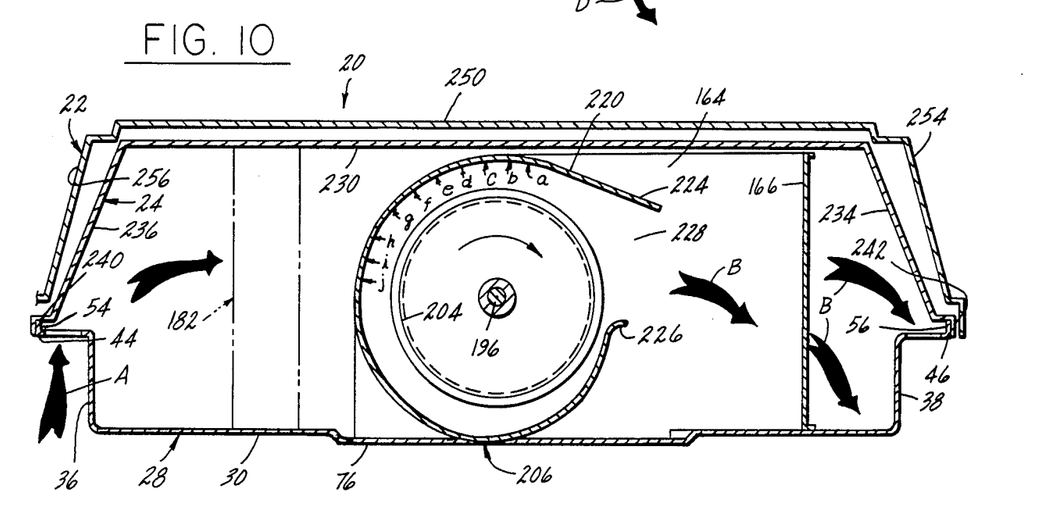

Another feature of the invention is the design, arrangement and orientation of the perimeter walls 214 and 220 and outlets 218 and 228 of blowers 202 and 206, respectively. FIGS. 9 and 10, illustrate to scale the profile of walls 214 and 220, respectively, which represent a deviation from the configuration of a blower perimeter wall profiling if made in accordance with standard design criteria for centrifugal blowers. In addition, performance has been further maximized, in accordance with the present invention, by increasing the transverse dimension (that lying in the plane of the drawing) of each of the blower outlets 218 and 228, essentially by moving the short wall of each outlet farther back along the scroll circle than would be indicated by standard design criteria. Moreover, the angle of the axis of outlet 228 of blower 206 has also been found to be generally critical for optimizing condenser blower efficiency, the angle shown in FIG. 10 being optimum, which is the aforementioned angle of about 30° relative to horizontal or to bottom wall 30 of base 28.

Thus, referring in more detail to FIGS. 9 and 10, the condenser blower housing walls 214 from the outlet 228 back to a point j (FIG. 10) is moved slightly closer to the center of scroll 204. In the case of the evaporator blower housing wall 220, the 180° arc running from point a to point s in FIG. 9 is given a larger radius of curvature and thus also is drawn somewhat closer to the mid point of scroll 200 than in conventional design practice.

More particularly, as seen in FIG. 10, the perimeter from point a to j of the condenser blower housing wall 220 in one working embodiment may be sub-divided into 10° increments spaced apart in an arc of 90° and labeled a through j. These points are spaced radially from the center of scroll 204 by the following distances in inches:

|   | WALL 220 RADII | STANDARD DESIGN |
| --- | --- | --- |
| a | 5.09" | 5.23" |
| b | 4.96" | 5.18" |
| c | 4.89" | 5.13" |
| d | 4.87" | 5.08" |
| e | 4.85" | 5.02" |
| f | 4.84" | 4.97" |
| g | 4.83" | 4.92" |
| h | 4.80" | 4.87" |
| i | 4.77" | 4.82" |
| j | 4.74" | 4.77" |

For comparison purposes the design radial spacing of such points pursuant to standard practice is shown in the right hand column adjacent the left hand column of the modified radii values.

Referring to FIG. 9, the evaporator blower housing wall 214 similarly has the following radial spacing distances for points a through e which sub-divide an arc of 180° into 10° increments:

|   | WALL 214 RADII | STANDARD DESIGN |
| --- | --- | --- |
| a | 5.92" | 5.92" |
| b | 5.81" | 5.85" |
| c | 5.71" | 5.78" |
| d | 5.61" | 5.72" |
| e | 5.51" | 5.65" |
| f | 5.41" | 5.59" |
| g | 5.31" | 5.52" |
| h | 5.20" | 5.46" |
| i | 5.10" | 5.39" |
| j | 5.00" | 5.33" |
| k | 4.97" | 5.26" |
| l | 4.94" | 5.19" |
| m | 4.91" | 5.13" |
| n | 4.88" | 5.06" |
| o | 4.85" | 5.00" |
| p | 4.83" | 4.93" |
| q | 4.80" | 4.87" |
| r | 4.77" | 4.80" |
| s | 4.74" | 4.74" |

Again, the right hand column represents standard design distances for such points.

From the foregoing description it will now be apparent that a roof mounted air conditioning unit constructed in accordance with the foregoing disclosure fully achieves the aforestated objects and provides many advantages and improved results over the prior art. It will also be understood that, although the foregoing description and drawings describe and illustrate in detail one commercially successful working embodiment of the present invention, to those skilled in the art to which the present invention relates the present disclosure will suggest many modifications in construction as well as widely differing embodiments and applications without thereby departing from the spirit and scope of the invention. The present invention, therefore, is intended to be limited only by the scope of the appended claims and the applicable prior art.

We claim:

1. An air conditioning unit comprising a cabinet with an assemblage of mechanical refrigeration system components mounted in an operable array in said cabinet and including a condenser coil disposed in a condenser coil compartment with said cabinet, said cabinet comprising a base pan having said components mounted thereon and a removable shroud mounted over said base pan to cover said components, wherein the improvement comprises said base pan having a bottom wall and an upstanding perimeter wall connected to said bottom wall having at its upper edge an outwardly protruding porch flange to provide an overhang ledge extending at least partially along the perimeter of said base pan, said ledge having air inlet and outlet means therein providing air flow communication between ambient air exteriorly of said cabinet and said interior condenser coil compartment of said unit.

2. The combination as set forth in claim 1 wherein said upstanding perimeter wall also has air inlet and outlet means therein juxtaposed below said air inlet and outlet means in said porch flange and augmenting air flow communication between ambient air exteriorly of said cabinet and said interior condenser coil compartment.

3. The combination as set forth in claim 2 wherein said porch flange extends around the entire upper edge of said perimeter wall so as to encircle said base pan and provide stiffening reinforcement for the same, and wherein said shroud has an outwardly protruding and downwardly extending mounting flange extending around the entire perimeter thereof and being seated in assembly on said base pan flange in substantially sealed relation therewith.

4. The combination as set forth in claim 3 wherein said shroud comprises generally flat top wall means and a downwardly and outwardly sloping perimeter wall means integrally connected to said top wall at the outer edge thereof and defining front, rear and opposite side walls terminating at said perimeter mounting ledge, said shroud being generally imperforate and serving as a roof-like cover for said base pan.

5. The combination as set forth in claim 4 wherein said shroud has a generally light color and said base pan has a generally dark color such that said air inlet and outlet means formed in said pan perimeter wall are camouflaged from view.

6. The combination as set forth in claim 4 wherein said shroud comprises a two-piece assembly consisting of an inner liner made of stamped sheet steel and having a generally close fit to said perimeter mounting flange of said base pan and resting thereon in assembled relation therewith, and an outer shroud comprising a one-piece molded plastic member having generally the same contour as said inner liner and being mounted in closely spaced nested relation and thereover and being dimensioned to hide said inner liner from exterior view.

7. The combination as set forth in claim 4 further including bulkhead means in said cabinet sub-dividing the same into at least an evaporator coil compartment and said condenser coil compartment, said components including first and second centrifugal blowers disposed respectively in said evaporator and condenser compartments for inducing air flow respectively therethrough, an electric motor coaxially disposed between said blowers and having a drive shaft coupled to said blowers for concurrent operation thereof, and a rotary hermetic compressor disposed in a cylindrical case and oriented with its longitudinal axis generally horizontal to thereby reduce the overall vertical dimension of said system components to provide a low profile cabinet.

8. The combination as set forth in claim 1 wherein said unit includes bulkhead means mounted on said base pan and extending upwardly therefrom to said shroud to sub-divide the interior space in said unit between said base pan and shroud into a series of isolated compartments, one of which comprises said interior condenser coil compartment, the remaining compartments comprising an evaporator compartment occupying the front end of the interior space of said unit and having an evaporator coil laterally spanning said evaporator compartment space, an air inlet opening in said base pan bottom wall disposed between said evaporator coil and the front end of said base pan, an evaporator compartment centrifugal blower disposed at the rearward end of said evaporator compartment on the side of said evaporator coil remote from said air inlet opening and having a discharge outlet extending through said bottom wall, said condenser compartment extending from said evaporator compartment rearwardly to the rear end of said unit and extending laterally from one side of said unit to about two-thirds of the way toward the other side of said unit, said condenser compartment containing a condenser centrifugal blower disposed generally centrally therein with its axis extending fore and aft of said unit and having inlet openings in the opposite axial ends thereof and a discharge outlet directed toward said other side of said unit, a condenser coil in said condenser compartment disposed between said air inlets and said condenser blower, a compressor compartment extending from said evaporator compartment to the rear end of said unit and laterally adjacent said condenser compartment to communicate with said other side of said base pan and said outlet means in said base pan, said condenser blower outlet being arranged to discharge through said compressor compartment to said air outlet means, said compressor compartment containing a hermetic compressor disposed therein offset out of the airstream from the discharge air from said condenser blower outlet.

9. The combination as set forth in claim 8 wherein said condenser coil is constructed to have a generally L-shape in plan view with one leg of said L extending across the rear of said condenser compartment between said air inlet means in the rear of said condenser compartment and the rearwardly facing inlet of said condenser blower and the other leg of said condenser coil extending along said one side of said unit between said air inlet means and said condenser blower and flanking said condenser blower.

10. The combination as set forth in claim 9 wherein said evaporator blower has a single inlet communicating with the interior of the scroll of said blower and facing the rear side of said evaporator coil, and wherein said condenser blower is coaxially aligned with said evaporator blower, an electric motor disposed in said condenser compartment between said condenser blower and said evaporator blower and having a single shaft protruding at its opposite ends from said motor and respectively carrying thereon for rotation therewith the scroll of said evaporator blower and the scroll of said condenser blower for rotatably driving said scrolls in unison.

11. An air conditioning unit adapted for roof mounting on a recreational vehicle or the like and presenting an overall low profile appearance thereon comprising a cabinet having a base pan and a cover with an assemblage of mechanical refrigeration system components mounted in an operable array in said cabinet on said base pan, said cabinet being generally rectangular in plan view with its front and rear ends forming the narrower ends thereof and adapted to be juxtaposed respectively to the front and rear ends of the vehicle, said cabinet having bulkhead means therein sub-dividing the interior of said cabinet into at least an evaporator coil compartment at the interior front of said cabinet and a condenser coil compartment extending from said evaporator coil compartment to the interior rear of said cabinet, wherein the improvement comprises having said components include first and second low profile centrifugal blowers disposed respectively in said evaporator and condenser compartments for inducing air flow respectively therethrough and oriented with their rotational axes extending front to rear in said cabinet, an electric motor coaxially disposed between said blowers and having a drive shaft on which said blowers are fixedly drivingly mounted for direct rotation therewith for concurrent operation thereof, and a rotary hermetic compressor disposed in a cylindrical casing and oriented with its longitudinal axis generally horizontal generally parallel to said blower axes and with its maximum vertical dimension below that of said blowers to thereby reduce the overall vertical dimension of said unit components to provide a low profile cabinet.

12. The combination as set forth in claim 11 wherein said unit includes bulkhead means mounted on said base pan and extending upwardly therefrom to said shroud to sub-divide the interior space in said unit between said base pan and shroud into a series of isolated compartments, one of which comprises said interior condenser coil compartment, the remaining compartments comprising an evaporator compartment occupying the front end of the interior space of said unit and having an evaporator coil laterally spanning said evaporator compartment space, an air inlet opening in said base pan bottom wall disposed between said evaporator coil and the front end of said base pan, said evaporator compartment centrifugal blower being disposed at the rearward end of said evaporator compartment on the side of said evaporator coil remote from said air inlet opening and having a discharge outlet extending through said bottom wall, said condenser compartment extending from said evaporator compartment rearwardly to the rear end of said unit and extending laterally from one side of said unit to about two-thirds of the way toward the other side of said unit, said cabinet having air inlet openings communicating said condenser compartment with ambient exterior air, said condenser compartment centrifugal blower being disposed generally centrally therein and having inlet openings in the opposite axial ends thereof and having a discharge outlet directed toward said other side of said unit, a condenser coil in said condenser compartment disposed between said condenser compartment air inlet openings and said condenser blower, a compressor compartment extending from said evaporator compartment to the rear end of said unit and laterally adjacent said condenser compartment along said other side of said base pan, said cabinet having air outlet openings communicating said compressor compartment with ambient exterior air, said condenser blower outlet being arranged to discharge air through said condenser compartment to said cabinet air outlet openings, said compressor compartment containing said hermetic compressor disposed therein offset out of the airstream discharged from said condenser blower outlet.

13. The combination as set forth in claim 12 wherein said condenser coil is constructed to have a generally L-shape in plan view with one leg thereof extending across the rear of said condenser compartment between said cabinet air inlet openings and the rearwardly facing inlet of said condenser blower and the other leg of said condenser coil extending along said one side of said unit adjacent said air inlet openings and said condenser blower.

14. The combination as set forth in claim 13 wherein said evaporator blower has a single inlet communicating with the interior of the scroll of said blower and facing the rear side of said evaporator coil, and wherein said condenser blower is coaxially aligned with said evaporator blower, said electric motor is disposed in said condenser compartment between said condenser blower and said evaporator blower and said drive shaft comprises a single shaft protruding at its opposite ends from said motor and respectively carrying thereon for rotation therewith in unison the scroll of said evaporator blower and the scroll of said condenser blower.

15. The combination as set forth in claim 14 wherein said base pan has a porch flange protruding outwardly from its upper edge and an upright perimeter wall carrying said flange and offset inwardly therefrom, said inlet and outlet openings in said base pan being located in said porch flange and perimeter wall.

16. The combination as set forth in claim 15 wherein said condenser blower is oriented with the axis of its discharge outlet angled downwardly toward said base pan at an angle of about 30° relative thereto.

17. The combination as set forth in claim 16 wherein said condenser blower has a housing including a curved perimeter wall encircling said scroll thereof, said perimeter wall terminating in a straight tangential extension defining the upper wall of said discharge outlet of said condenser blower, the curvature of said perimeter wall for about 90° thereof ending at said extension deviating from standard design criteria in a relationship thereto of radii from scroll center substantially as shown and described herein, said condenser blower discharge outlet being enlarged in the direction of scroll rotation over standard design criteria as shown and described herein.

18. The combination as set forth in claim 15 wherein said evaporator blower has a housing including a curved perimeter wall encircling said scroll thereof, said perimeter wall terminating in a straight tangential extension defining the outer wall of said discharge outlet of said evaporator blower, the curvature of said perimeter wall for about 180° thereof ending at said extension deviating from standard design criteria in a relationship thereto of radii from scroll center substantially as shown and described herein, said evaporator blower discharge outlet being enlarged in the direction of scroll rotation over standard design criteria as shown and described herein.

19. The combination as set forth in claim 18 wherein said condenser blower has a housing including curved perimeter wall encircling said scroll thereof, said perimeter wall terminating in a straight tangential extension defining the upper wall of said discharge outlet of said condenser blower, the curvature of said perimeter wall for about 90° thereof ending at said extension deviating from standard design criteria in a relationship thereto of radii from scroll center substantially as shown and described herein, said condenser blower discharge outlet being enlarged in the direction of scroll rotation over standard design criteria as shown and described herein.

20. The combination as set forth in claim 12 wherein said condenser blower has a housing including a curved perimeter wall encircling said scroll thereof, said perimeter wall terminating in a straight tangential extension defining the upper wall of said discharge outlet of said condenser blower, said condenser blower discharge outlet being enlarged in a direction of scroll rotation over standard design criteria as shown and described herein.

21. The combination as set forth in claim 12 wherein said evaporator blower has a housing including a curved perimeter wall encircling said scroll whereof, said perimeter wall terminating in a straight tangential extension defining the outer wall of said discharge outlet of said evaporator blower, said evaporator blower discharge outlet being enlarged in a direction of scroll rotation over standard design criteria as shown and described herein.

22. The combination as set forth in claim 21 wherein said condenser blower has a housing including a curved perimeter wall encircling said scroll thereof, said perimeter wall terminating in a straight tangential extension defining the upper wall as said discharge outlet of said condenser blower, said condenser blower discharge outlet being enlarged of the direction of scroll rotation over standard design criteria as shown and described herein.

23. The combination as set forth in claim 12 wherein said cabinet air inlet openings and cabinet air outlet openings are formed in said base pan.

24. The combination as set forth in claim 13 wherein said cabinet air inlet openings are formed in said base pan.

25. An air conditioning unit adapted for roof mounting on a recreational vehicle or the like comprising a cabinet with as assemblage of mechanical refrigeration system components mounted in an operable array in said cabinet and including a condenser coil disposed in a condenser coil compartment within said cabinet, said cabinet comprising a base pan having said components mounted thereon and a removable shroud mounted over said base pan to cover said components, wherein the improvement comprises said base pan having a horizontally disposed bottom wall and an upstanding perimeter wall connected to said bottom wall having at its upper edge an outwardly protruding flange to provide an overhang ledge extending at least partially along the perimeter of said base pan, said shroud having a top wall and front, rear and side walls dependent therefrom defining a continuous lower edge mounted on said flange, said perimeter wall having a vertical height less than that of said shroud front, rear and side walls with air inlet means therein below said overhang ledge providing air flow communication between ambient air exteriorly of said cabinet and said interior condenser coil compartment of said unit, said air inlet means being recessed toward the interior of said cabinet relative to said ledge to thereby reduce the visibility of said air inlet means from the exterior of said unit.

26. The combination as set forth in claim 25 wherein said upstanding perimeter wall also has air outlet means therein below said flange and augmenting air flow communication between ambient air exteriorly of said cabinet and said interior condenser coil compartment.

27. The combination as set forth in claim 26 wherein said flange extends around the entire upper edge of said perimeter wall so as to encircle said base pan and provide stiffening reinforcement for the same, and wherein said shroud has outwardly protruding and downwardly extending mounting flange means around the perimeter thereof and being seated in assembly on said base pan flange.

28. The combination as set forth in claim 26 wherein said shroud has a generally light color and said base pan has a generally dark color such that said air inlet and outlet means formed in said pan perimeter wall are camouflaged from view.

29. The combination as set forth in claim 25 further including bulkhead means in said cabinet sub-dividing the same into at least an evaporator coil compartment and said condenser coil compartment, said components including first and second centrifugal blowers disposed respectively in said evaporator and condenser compartments for inducing air flow respectively therethrough, an electric motor coaxially disposed between said blowers and having a drive shaft coupled to said blowers for concurrent operation thereof, and a rotary hermetic compressor disposed in a cylindrical case and oriented with its longitudinal axis generally horizontal to thereby reduce the overall vertical dimension of said system components to provide a low profile cabinet.

30. The combination as set forth in claim 26 wherein said unit includes bulkhead means mounted on said base pan and extending upwardly therefrom to said shroud to sub-divide the interior space in said unit between said base pan and shroud into a series of isolated compartments, one of which comprises said interior condenser coil compartment, the remaining compartments comprising an evaporator compartment occupying the front end of the interior space of said unit and having an evaporator coil laterally spanning said evaporator compartment space, an air inlet opening in said base pan bottom wall disposed between said evaporator coil and the front end of said base pan, an evaporator compartment centifugal blower disposed at the rearward end of said evaporator compartment on the side of said evaporator coil remote from said air inlet opening and having a discharge outlet extending through said bottom wall, said condenser compartment extending from said evaporator compartment rearwardly to the rear end of said unit and extending laterally from one side of said unit to about two-thirds of the way toward the other side of siad unit, said condenser compartment containing a condenser centrifugal blower disposed generally centrally therein with its axis extending fore and aft of said unit and having inlet openings in the opposite axial ends thereof and a discharge outlet directed toward said other side of said unit, a condenser coil in said condenser compartment disposed between said air inlets and said condenser blower, a compressor compartment extending from said evaporator compartment to the rear end of said unit and laterally adjacent said condenser compartment to communicate with said other side of said base pan and said outlet means in said base pan, said condenser blower outlet being arranged to discharge through said compressor compartment to said air outlet means, said compressor compartment containing a hermetic compressor disposed therein offset out of the airstream from the discharge air from said condenser blower outlet.

31. The combination as set forth in claim 30 wherein said condenser coil is constructed to have a generally L-shape in plan view with one leg of said L extending across the rear of said condenser compartment between said air inlet means in the rear of said condenser compartment and the rearwardly facing inlet of said condenser blower and the other leg of said condenser coil extending along said one side of said unit between said air inlet means and said condenser blower and flanking said condenser blower.

32. The combination as set forth in claim 31 wherein said evaporator blower has a single inlet communicating with the interior of the scroll of said blower and facing the rear side of said evaporator coil, and wherein said condenser blower is coaxially aligned with said evaporator blower, an electric motor disposed in said condenser compartment between said condenser blower and said evaporator blower and having a single shaft protruding at its opposite ends from said motor and respectively carrying thereon for rotation therewith the scroll of said evaporator blower and the scroll of said condenser blower for rotatably driving said scrolls in unison.

* * * * *